United States Patent
Othman et al.

(10) Patent No.: US 8,421,654 B2
(45) Date of Patent: Apr. 16, 2013

(54) METHOD OF DECODING A SIGNAL IMPLEMENTING A PROGRESSIVE CONSTRUCTION OF A DECODING TREE, CORRESPONDING COMPUTER PROGRAM AND DECODING DEVICE

(75) Inventors: Ghaya Rekaya-Ben Othman, Anthony (FR); Abdellatif Salah, Rennes (FR); Samuel Guillouard, Chantepie (FR)

(73) Assignee: Institut Telecom/Telecom Paristech, Paris Cedex (FR)

( * ) Notice: Subject to any disclaimer, the term of this patent is extended or adjusted under 35 U.S.C. 154(b) by 120 days.

(21) Appl. No.: 12/991,234

(22) PCT Filed: May 5, 2009

(86) PCT No.: PCT/EP2009/055433
§ 371 (c)(1),
(2), (4) Date: Jan. 28, 2011

(87) PCT Pub. No.: WO2009/135850
PCT Pub. Date: Nov. 12, 2009

(65) Prior Publication Data
US 2011/0122004 A1 May 26, 2011

(30) Foreign Application Priority Data
May 5, 2008 (FR) ...................................... 08 52985

(51) Int. Cl.
*H03M 7/00* (2006.01)
(52) U.S. Cl.
USPC ........................................... 341/107; 341/50

(58) Field of Classification Search ................... 341/50, 341/51, 65, 67, 107, 106, 79, 87; 382/239
See application file for complete search history.

(56) References Cited

U.S. PATENT DOCUMENTS 5,574,910 A * 11/1996 Bialkowski et al. ................... 1/1
5,635,931 A *  6/1997 Franaszek et al. ............... 341/51
(Continued)

FOREIGN PATENT DOCUMENTS
EP 1460813 A1 9/2004

OTHER PUBLICATIONS

Rekkaya-Ben Othman "Nouvelles Constructions Algebriques de Codes Spatio-temporels atteignant le compromis multiplexage-diversite" Thesis, Telecom Paris, Dec. 17, 2004.—English Abstract on p. vii.

(Continued)

*Primary Examiner* — Peguy Jean Pierre
(74) *Attorney, Agent, or Firm* — David D. Bush; Westman, Champlin & Kelly, P.A.

(57) ABSTRACT

A method of decoding a data signal includes progressively constructing a decoding tree, implementing at least two iterations of the following steps: selecting at least one child node of a current node belonging to a selection interval; storing the child nodes in a first stack; deleting the current node from the first stack; selecting a new current node from the first stack; and if the new current node is a leaf node, storing the path between the root node and the leaf node, in the second stack, and deleting the leaf node from the first stack; otherwise, return to the step of selecting a child node for the new current node. Moreover, the method assigns a probability of likelihood to the bits of at least one symbol of the data signal, taking account of the paths stored in the second stack, and determines a probabilistic estimation of the signal.

13 Claims, 9 Drawing Sheets

U.S. PATENT DOCUMENTS

| | | | |
|---|---|---|---|
| 7,249,311 B2* | 7/2007 | Lamy | 714/796 |
| 2010/0310186 A1* | 12/2010 | Liu et al. | 382/239 |
| 2011/0243279 A1* | 10/2011 | Thian et al. | 375/340 |

OTHER PUBLICATIONS

Caire G. et al., "On Maximum-Likelihood Detection and the Search for the Closest Lattice Point" IEEE Transactions on Information Theory, Oct. 1, 2003.

Giannakis G. B. et al., "Sphere Decoding Alogrithms with Improved Radius Search" IEEE Transactions on Communications, Jul. 1, 2005.

Murugan A. D. et al., "A Unified Framework for Tree Search Decoding: Rediscovering the Sequential Decoder" IEEE Transactions on Information Theory, Mar. 1, 2006.

International Search Report dated Oct. 20, 2009 for corresponding International Application No. PCT/EP2009/055433, filed May 5, 2009.

J. Boutros et al., "Soft-Input Soft Output Lattice Sphere Decoder for Linear Channels" IEEE Global Telecommunications Conference, 2003.

E. Viterbo et al., "A Universal Lattice Code Decoder for Fading and Channels" IEEE Transactions on Information Theory, Jul. 1999.

J.C. Belfiore et al., "The Golden Code: A 2×2 Full-Rate Space-Time Code with Non-Vanishing Determinants" IEEE Transactions on Information Theory, vol. 51, n4, pp. 1432-1436, Apr. 2005.

V. Tarokh et al., "Space-Time Block Codes From Orthogonal Designs" IEEE Transactions on Information Theory, vol. 45, pp. 1456-1467, Jul. 1999.

H. Bolcskei et al., "Space-Frequency Coded Broadband OFDM Systems" Proceedings on Wireless Communication Networking Conf., Chicago, Sep. 23-28, 2000, pp. 1-6.

S. Alamouti, "Space-Time Block Coding: A Simple Transmitter Diversity Technique for Wireless Communications" IEEE Journal on Select Areas in Communications, vol. 16, pp. 1451-1458, Oct. 1998.

F. Jelinek, "A Fast Sequential Decoding Algorithm Using a Stack" IBM Journal Research Development Nov. 1969—Abstract.

International Preliminary Report on Patentability for corresponding International Application No. PCT/EP2009/055433, filed May 5, 2009.

\* cited by examiner

| [10], C21 |
|---|
| [11], C22 |
| [0], C1 |
| |

Fig 8A

| [100], C211 |
|---|
| [101], C212 |
| [11], C22 |
| [0], C1 |
| |

Fig 8B

| [101], C212 |
|---|
| [11], C22 |
| [1001], C2112 |
| [1000], C2111 |
| [0], C1 |
| |

| [111], C222 |
|---|
| [1011], C2122 |
| [1001], C2112 |
| [1000], C2111 |
| [110], C221 |
| [0], C1 |
| |

Fig 8E

| [1110], C2221 | a2
|---|
| [1111], C2222 |
| [1011], C2122 |
| [1001], C2112 |
| [1000], C2111 |
| [110], C221 |
| [0], C1 |
| |

Fig 8F

METHOD OF DECODING A SIGNAL IMPLEMENTING A PROGRESSIVE CONSTRUCTION OF A DECODING TREE, CORRESPONDING COMPUTER PROGRAM AND DECODING DEVICE

CROSS-REFERENCE TO RELATED APPLICATIONS

This Application is a Section 371 National Stage Application of International Application No. PCT/EP2009/055433, filed May 5, 2009 and published as WO 2009/135850 on Nov. 12, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of digital communication.

More specifically, the disclosure relates to the receipt and decoding of digital signals, received for example in the context of a multi-antenna or multi-user transmission.

BACKGROUND OF THE DISCLOSURE

A major problem in the field of digital communications is that of decoding the signals received.

Indeed, after transmission, the signals are transported in a transmission channel that can be more or less noisy. The signals received are therefore more or less disrupted, and it may be necessary to implement a specific treatment in order to properly decode them.

To obtain good decoding performances, it is desirable to use an optimal maximum likelihood (ML) decoding technique. An optimal decoder makes it possible to estimate the likeliest candidate signal, given the observed signal received.

To perform an optimal ML decoding, all of the potential transmitted signals (also called candidate signals) are classically counted, and the likeliest signal is selected. For example, the selection criterion consists of calculating a Euclidean distance between the observed signal received and the candidate signals.

Unfortunately, such an exhaustive count is costly in terms of time and resources, and can be difficult to implement in real-time applications. Indeed, the number of candidates, and therefore the complexity of the decoder, exponentially increase with the length of the digital signal. For example, a digital signal having a length of 10 bits can have $2^{10}=1024$ different values, and all of these values must be counted in the classic ML decoding.

To overcome this disadvantage of exhaustive enumerating, other decoding techniques have appeared, such as sequential decoding techniques. These techniques use a tree representation of the problem, in which each path from the root node to a leaf node is a potential transmitted signal.

Indeed, it is noted that a data structure can be represented in the form of a tree structure having a set of nodes. For a constellation $2^n$ QAM (Quadrature Amplitude Modulation), n branches leave from a node of the tree. The first node of the tree is called the root node. Each node of a tree can have zero, one or more son nodes, which are located below it in the tree. A node that does not have any son node is called a leaf node. It corresponds to the lowest level in the tree. A node has at most one parent node, located above it in the tree. The root node is the highest node in the tree, and does not have a parent node. The depth (or dimension) of a node is the length of the path from said node to its root. The root node is the node on which operations on the tree ordinarily begin. All of the other nodes can be reached from it by following links.

From this tree representation, the sequential decoding counts a smaller number of candidate signals than in an optimal ML decoder. For example, with a number of symbols Q equal to 8 and by using a constellation 16 QAM, a classic ML decoder counts $16^8$ candidate signals in order to decode a space/time code word, while a stack decoder counts only very few of them. To do this, the sequential decoding techniques take into account a cost (or metric) constraint, so as to determine a single candidate path inside a decoding tree. Classically, the cost associated with a current node is defined by the Euclidean distance between the signal received and the path between the root node and the current node.

The sequential decoding can be implemented in a stack decoder, delivering a hard estimation of the signal transmitted, i.e. a binary estimation, as described in particular in the documents "*A fast sequential decoding algorithm using a stack*" (F. Jelinek, "*IBM Journal Research Development*", volume 13 pages 675 to 685, November 1969) or "*A unified framework for tree search decoding: rediscovering the sequential decoder*" (Arul Murugan et al., "IEEE transaction on information theory", volume 52, pages 933 to 953, March 2006).

If no cost constraint is set, such a decoder has optimal ML performance. However, if a constraint is set, in order to limit the tree searching time, for example, the performances obtained are sub-optimal, i.e. inferior to the performances obtained by implementing an ML technique.

Such a sub-optimal decoding technique is therefore less complex and requires fewer resources than an optimal technique, but does not have good performance.

Sequential decoders delivering a soft estimation of the transmitted signal, i.e. a probabilistic estimation, as in the document "*Soft-Input soft-output lattice sphere decoder for linear channels*" (J. Boutros et al., IEEE Global Telecommunications Conference, 2003).

Unfortunately, these sequential soft decision decoders are very complex. Moreover, the list of potential paths determined from the decoding tree, and from which a probabilistic estimation of the transmitted signal is determined, is not optimized.

SUMMARY

An aspect of the disclosure relates to a method for decoding a signal received, corresponding to a transmitted data signal transported by means of a transmission channel.

The method is considered to implement a progressive construction of a decoding tree, in which a node corresponds to a component of a symbol of said data signal, and is associated with a cost.

According to an embodiment of the invention, the construction of the decoding tree implements at least two iterations of the following steps, for a current node of the tree stored in a first stack, in which each iteration makes it possible to store, in a second stack, a path between the root node of the tree and a leaf node:

selection of at least one son node of said current node belonging to a predetermined selection interval, if at least one such node exists;

storage, in said first stack, the selected son nodes and associated costs;

deletion, from said first stack, of said current node;

selection from said first stack of a new current node, taking into account the associated cost; and if said new current node is a leaf node that does not have any son node, storage of the path between the first node of said tree, called the root node, and said leaf node, in the second stack, and deletion of the leaf node from the first stack;

otherwise, return to the step of selection of at least one son node for said new current node.

The method according to an embodiment of the invention also assigns a likelihood probability to the bits of at least one symbol of the data signal, taking into account paths stored in the second stack, and includes a step of determining a probabilistic estimation of the data signal (single-carrier and multi-carrier), taking into account the path(s) stored in the second stack and likelihood probabilities.

An embodiment of the invention thus proposes a new solution for decoding a signal received, based on a stack algorithm (stack decoding).

More specifically, an embodiment of the invention proposes a modification of the stack decoding making it possible to have a soft output, i.e. a probabilistic estimation of the transmitted signal, while reducing the decoding complexity. It is noted that if a single iteration is performed, delivering a single path between the root node of the tree and a leaf node, the optimal ML performances are obtained.

To do this, an embodiment of the invention proposes limiting the number of nodes developed in the decoding tree, by generating only nodes belonging to a predetermined selection interval. Thus, the costs associated with the nodes belonging to the selection interval are calculated and stored in the first stack.

It is thus possible to preserve only nodes having a cost less than or equal to a predetermined threshold C.

For example, this threshold C corresponds to the radius of a sphere centred on the signal received. The paths capable of being traveled in the tree then correspond to symbol vectors (also called points of the lattice in reference to lattices) located inside said sphere.

According to this example, the selection interval is determined for each component of a symbol of the data signal from a first interval determined from the sphere of radius C centred on said signal received, and a second interval determined from the constellation of symbols. The selection interval is calculated for each node (component) as the decoding tree is constructed.

In particular, the radius of the sphere can be chosen arbitrarily or according to at least one characteristic of the transmission channel.

Thus, for a current node, all of the son nodes belonging to the selection interval are selected, and, on the basis of these selected son nodes, a path is constructed between the root node and a leaf node of the tree, corresponding to a potential transmitted signal.

Each path thus constructed during a stack decoding iteration is stored in a second stack. It is thus possible to determine a list of potential transmitted signals, by implementing a plurality of iterations, enabling each to store a new path in the second stack. A probabilistic estimation of the transmitted signal is thus obtained. For example, such a probabilistic output is desirable if a channel coding is used.

According to an embodiment of the invention, a likelihood probability is also assigned to the bits of at least one symbol of the data signal by taking into account the paths stored in the second stack. The estimation of the data signal is then a probabilistic, or soft, estimation, taking into account likelihood probabilities.

It is noted that the criterion for stopping the iterations can be defined in different ways.

For example, the iterations are implemented as long as the second stack is not filled. Thus, the iterations are implemented as long as the cost associated with said current node is less than or equal to a predetermined threshold.

According to another example, if a hard estimation of the signal is sufficient, the size of the stack can be limited so as to store only one path, and optionally the cost associated with said path.

Indeed, according to another alternative embodiment, the method can implement a single iteration, delivering a hard estimation of the transmitted signal.

Thus, if a single iteration is implemented, a single path between the root node and a leaf node is stored in the second stack, and the estimation of the data signal is a binary, estimation.

According to a specific embodiment of the invention, the iterations include a step of ordering the first stack, prior to the step of selecting a new current node, ordering said nodes according to the associated cost, and the node having the lowest cost is located first in the first stack.

In this way, in the step of selecting a new current node, the first node in the first stack is selected.

It is noted that, classically, the cost associated with a node is defined by the Euclidean distance (or a function of the distance) between the signal received and the path between the root node and said node.

According to an alternative embodiment, the iterations include a step of determining the costs of son nodes belonging to the selection interval, and of subtracting a bias from the cost associated with the son node, prior to said storage step.

In this way, the decoding complexity is further limited, by preferring the more advanced paths (i.e. the deepest nodes) in the tree. This alternative enables the complexity to be reduced, but produces suboptimal performances.

According to a first application example, the method according to an embodiment of the invention is implemented in a multi-antenna system. Thus, the data signal is transmitted over at least one transmission antenna and received on at least one receiving antenna.

For example, the data signal has been subjected to a space-time coding before transmission, and the construction of the tree is implemented in a space-time decoding step.

According to a second application example, the method according to an embodiment of the invention is implemented in a multi-user system. Thus, the data signal is transmitted by at least two distinct users.

An embodiment of the invention also relates to a computer program product that can be downloaded from a communication network and/or recorded on a computer-readable medium and/or capable of being run by a processor, including program code instructions for implementation of the decoding method as described above.

Another embodiment of the invention relates to another device for decoding a signal received, corresponding to a transmitted data signal transported by means of a transmission channel, including means for progressive construction of a decoding tree, in which a node corresponds to a component of a symbol of said data signal, and is associated with a cost, and a first stack in which a current node of said tree is stored.

According to this embodiment, the construction means include the following means, activated for at least two iterations enabling each to store, in a second stack, a path between the root node of the tree and a leaf node:

means for selecting at least one son node from said current node belonging to a predetermined selection interval, if at least one such node exists;

means for storing, in said first stack, the selected son nodes and associated costs;

means for deleting, from said first stack, said current node;

means for selecting, from said first stack, a new current node, taking into account the associated cost; and means for storing the path between the first node of said tree, called the root node, and said leaf node, in the second stack;

means for deleting the leaf node from the first stack;

and the device also includes:

means for assigning a likelihood probability to the bits of at least one symbol of said data signal, taking into account the paths stored in the second stack, and means for determining a probabilistic estimation of the data signal, on the basis of the path(s) stored in the second stack and likelihood probabilities.

Such a decoding device is particularly suitable for implementing the decoding method described above. It can, for example, be integrated in a receiver of an MIMO or multi-user system, including one or more receiving antennas.

This device can of course comprise the different features relating to the decoding method according to an embodiment of the invention.

In particular, this device can be comprised of at least one circuit belonging to the group including:

FPGA (Field Programmable Gate Array);
ASIC (Application-Specific Integrated Circuit);
VLSI (Very Large Scale Integration).

Thus, the decoding technique proposed can be implemented according to a software-only configuration, a hardware-only configuration (for example in one or more FPGA, ASIC or VLSI integrated circuits with the corresponding memory) or according to a mixed configuration.

BRIEF DESCRIPTION OF THE DRAWINGS

Other features and advantages will become clearer in view of the following description of a specific embodiment, provided as an illustrative and non-limiting example, and the appended drawings, in which:

FIGS. 8A to 8F show the contents of the first stack during the construction of the tree of FIG. 7;

DETAILED DESCRIPTION OF ILLUSTRATIVE EMBODIMENTS

1. General Principle

Figure 1:
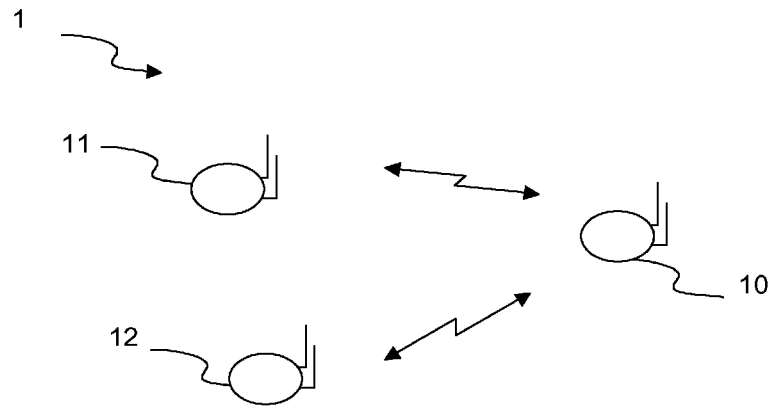
FIG. 1 shows a wireless network.

The general principle of an embodiment of the invention is based on the modification of a sequential stack decoding technique for reducing the decoding complexity. To do this, during the construction of the decoding tree, the number of sons determined for a current node is reduced, and only the nodes belonging to a predefined selection interval are determined.

Indeed, it is noted that, for the construction of a decoding tree according to the technique described in the aforementioned documents "*A fast sequential decoding algorithm using a stack*" or "*A unified framework for tree search decoding: rediscovering the sequential decoder*", n branches start from each node of the tree for a constellation $2^n$ QAM. According to an embodiment of the invention, it is proposed to reduce the number of branches starting from each node, by generating only the son nodes belonging to a predefined selection interval.

To do this, according to a specific embodiment of the invention, the characteristics of the sequential decoders and the sphere decoders are combined. A sphere of radius C, centred on the received signal is thus considered. During the progressive construction of the decoding tree, only the nodes corresponding to points inside the sphere are generated. In other words, each son node is generated and stored in a first stack only if its cost remains below radius C.

The classic sphere decoding technique is described in particular in the document "*A Universal Lattice Code Decoder for Fading and Channels*" (J. Boutros et E. Viterbo, IEEE Transactions on Information Theory, July 1999). The main difference between the algorithm proposed and the classic sphere decoding is the point scan strategy in the sphere. Indeed, sphere decoding uses the "Depth First Search" strategy and the algorithm proposed uses the "Best First Search" strategy.

In this way, the searching time and the number of calculations for determining a candidate signal are reduced. It can also be noted that, regardless of the radius of the sphere, the performance of the algorithm proposed is always optimal in the ML sense, but it is the decoding complexity that varies. Thus, the smaller radius of the sphere is, the smaller the decoding tree will be, and the less complex the decoding will be.

For example, by using the same formulas as proposed in the document "*A Universal Lattice Code Decoder for Fading and Channels*", scanning the points in the sphere of radius C, for each real or imaginary component of a symbol of the signal to be decoded, an interval $I_i=[binf_i, Bsup_i]$ is obtained. To add the constraint associated with the constellation, the intersection between the interval [Cmin, Cmax] (corresponding to the constellation with a change of variable to be positioned in Z instead of 2 Z, in which Z is the set of relative integers and 2 Z is the set of relative even integers) and the intervals $I_i$ are considered. For example, for a 16QAM modulation Cmin=0 and Cmax=3. The final interval to which the nodes of the $i^{th}$ level can belong is:

$$I_{ifinal}=[\max(Cmin, Binf_i), \min(Cmax, Bsup_i)].$$

It therefore includes a set of integers to which the real or imaginary parts of a symbol can belong.

Figure 10:
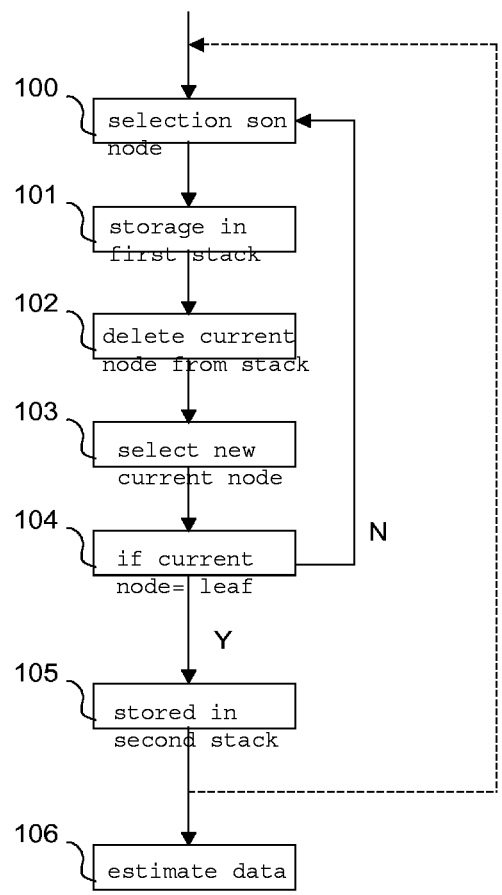
FIG. 10 shows the general principle of an embodiment of the invention.

Below, in reference to FIG. 10, the main steps implemented by the decoding method according to an embodiment of the invention will now be described.

The construction of the decoding tree implements at least one iteration of the following steps, for a current node of the tree stored in a first stack.

The algorithm begins at the level of the root node. The first current node is therefore the root node.

During a first step 100, the selection interval to which the son nodes of the current node will belong is determined (on the basis, for example, of the radius of the sphere). Then, the son nodes belonging to this selection interval are generated, and the costs associated with each of these nodes is calculated.

The son nodes belonging to this selection interval are stored during a step 101 in the first stack. These son nodes represent branches authorized for the first level of the tree.

The current node is then deleted from the first stack during a step 102, then a new current node is selected in the first stack during a step 103. The new selected node is the node that has the lowest cost.

A test (104) is then performed to determine whether the new current node is a leaf:
  if the new current node is a leaf node, which does not have any son node, the path between the root node and the leaf node is stored (105) in a second stack, then the leaf node of the first stack is deleted;
  otherwise, the step (100) of selecting at least one son node for the new current node is repeated.

It is possible to implement one or more iterations of these steps 100 to 105.

Each iteration enables a path between the root node and a new leaf node to be stored in the second stack.

It is then possible, during a step 106 to determine an estimation of the data signal, by taking into account the path(s) stored in the second stack. Thus, the estimation of the signal can be a binary estimation (hard decision) if the construction of the tree implements a single iteration enabling a single path to be determined, or it can be a probabilistic estimation (soft decision) if the construction of the tree implements a plurality of iterations, enabling each to determine a path.

In particular, it can be noted that the method can be implemented in various ways, in particular in hardwired form or in software form.

The decoding technique proposed therefore enables a progressive "horizontal" construction of the decoding tree, in the sense that, for a current node, the set of son nodes belonging to the selection interval is determined.

In addition, in the first stack, each node associated with its cost is stored. In this way, it is not necessary to recalculate the data relating to a node each time this node is visited.

Thus, the decoding technique according to an embodiment of the invention is based on a new approach of the stack decoding, enabling the complexity of the decoding to be reduced, by reducing the search area and the number of nodes reconstructed, in particular when a single iteration is implemented. Thus, the advantages of stack decoding are combined by optimizing the construction the decoding tree, and sphere decoding, by limiting the number of nodes considered.

In addition, an embodiment of the invention proposed makes it possible to have a probabilistic (or soft) output when a plurality of iterations are implemented. Indeed, the implementation of a plurality of iterations enables a list of candidate paths to be stored in a second stack. Such a probabilistic output can be necessary, for example, if a channel coding is used upstream.

An embodiment of the invention can in particular be integrated in a receiver, for example for the decoding of data transmitted in a MIMO (Multiple Input Multiple Output) channel or for the detection of multiple users.

In particular, if the data transmitted in an MIMO channel are coded by an STBC (Space Time Block Code) code and transmitted over a large number of antennas (at least four transmission antennas, for example, the decoding technique proposed makes it possible to reduce the decoding complexity. Consequently, the technique proposed makes it possible to implement high-speed wireless transmissions with a low error rate with a receiver of reasonable complexity.

Two examples of applications of embodiments of the invention are described below, one relating to the decoding of a signal received in a multi-antenna system, and the other relating to the decoding of a signal received in a multi-user system.

When applied to MIMO decoding, the dimensions of the signals received correspond to K (in real notation for an nQAM or nPSK (Phase Shift Keying) modulation) or Q (in complex notation for an nQAM or nPSK modulation or in polar notation for an nPSK modulation). When applied for detection of multiple users, the dimensions of the signal received correspond to the number of users (Q in complex notation or polar notation (if the users use an nPSK modulation)) or K=2Q in real notation.

2. Application to Multi-Antenna Systems

Below, an example of an implementation of an embodiment of the invention in the context of an MIMO transmission implementing an STBC code in transmission is described.

It is indeed noted that the multi-antenna transmission techniques make it possible to achieve a higher transmission capacity by increasing the spectral efficacy in the transmission channel, owing to the use of space/time codes in transmission. These space/time codes make it possible in particular to distribute the symbols modulated over various degrees of freedom of the channel.

FIG. 1 shows a wireless network 1 including a plurality of stations 10 to 12. Each station 10 to 12 includes a transmitter and a receiver including one or more antennas. For example, station 10 communicates with stations 11 and 12 by means of a wireless connection.

Figure 2:
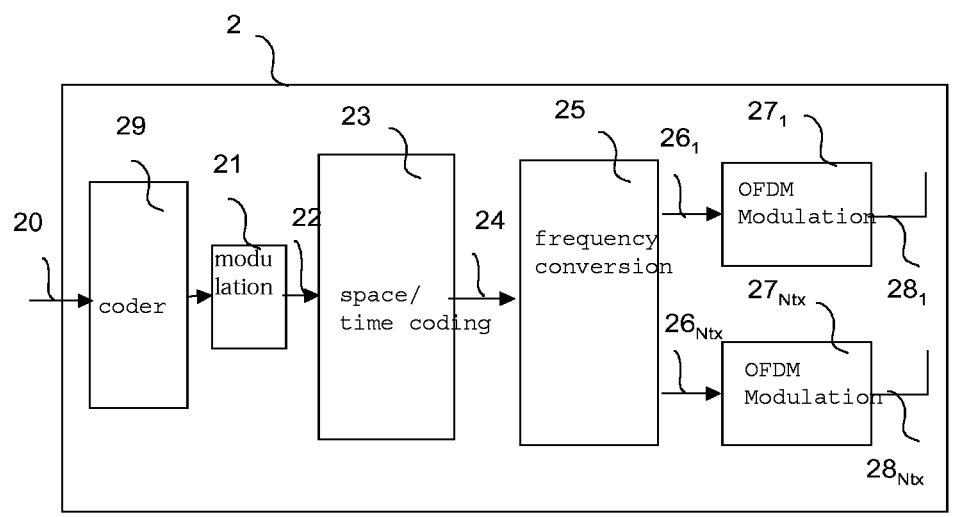
FIG. 2 shows the main steps implemented by a transmitter for a first application of an embodiment of the invention.

FIG. 2 more specifically shows the various steps implemented on the transmission side. Such a transmitter 2 can transmit a signal to a receiver by means of a noisy MIMO channel. The data transmitter 2 can in particular be integrated in the stations 10 to 12. According to the example shown, the transmitter 2 implements:
  a convolutional coding 29,
  a QAM modulation 21, delivering symbols 22,
  a space/time coding 23, delivering a code word 24;
  a time/frequency conversion 25;
  an OFDM modulation ($27_1$ to $27_{Ntx}$) of each signal $26_1$ to $26_{Ntx}$ resulting from the time/frequency conversion 25; and
  a transmission on Ntx transmission antennas $28_1$ to $28_{Ntx}$, in which each transmission antenna is associated with an OFDM modulator $27_1$ to $27_{Ntx}$.

More specifically, the transmitter 2 receives, at the input, a binary signal 20. The binary signal 20 is first coded by a convolutional code 29, having, for example, a rate equal to 1/2 with, as polynomial generators (7,5) in octal notation. Then, the signal is modulated by the modulator 21 according to a first modulation scheme, for example, a quadrature amplitude modulation nQAM with n equal to 16, 32, 64 or 256, etc. The modulator 21 can also implement a modulation scheme by phase shift, for example of the nPSK type, or any modulation.

The modulation step 21 makes it possible in particular to generate complex symbols belonging to the group of symbols S1 to SQ. For example, in the context of a 4QAM modulation, S1=1+i, S2=1−i, S3=−1−i and S4=−1+i.

The modulated symbols 22 are then coded by the space-time coder 23 to form a code word STBC 24. The STBC code is, for example, the Golden Code as described in the document "*The Golden Code: A 2×2 Full-Rate Space-Time Code with Non-Vanishing Determinants*" (J. -C. Belfiore, G. Rekaya, E. Viterbo, IEEE Transactions on Information Theory, vol. 51, no. 4, pages 1432-1436, April 2005). The STBC code can also be a code as described in the document "*Space-Time block codes from orthogonal designs*" (V. Tarokh, H. Jafarkhani and R. A. Calderbank, IEEE Transactions on Information Theory, vol. 45, pages 1456 to 1467, July 1999). The STBC code is thus based on a complex matrix of dimension Ntx*N, in which Ntx is the number of transmission antennas and N is the time length of the STBC code.

Thus, the space/time coding can be based on a block code. According to an alternative, the space/time coding is a spatial multiplexing. In this case, the modulated symbols are directly sent to the transmission antennas.

The code word 24 generated is then converted from the time domain to the frequency domain and distributed over the Ntx transmission antennas. Each dedicated signal $26_1$ to $26_{Ntx}$ is then modulated by an OFDM modulator $27_1$ to $27_{Ntx}$, then transmitted over the corresponding transmission antenna $28_1$ to $28_{Ntx}$, optionally after filtering, frequency transposition and amplification (steps classically implemented for a radiofrequency signal).

The architecture of a transmitter according to this example is more specifically described in the document "*Space frequency coded broadband OFDM systems*" (H. Bölcskei and A. J. Paulraj, Proceedings on Wireless Commun. Networking Conf., Chicago, 23 to 28 Sep. 2000, pages 1 to 6).

Of course, the decoding technique is not limited to the receiving of a signal transmitted by a transmitter as shown in FIG. 2. For example, it is possible to replace the multicarrier OFDM modulation with any other single-carrier or multi-carrier modulation, such as advanced OFDM, implementing a filtering by a prototype function such as the IOTA (Isotropic Orthogonal Transform Algorithm) function. In the case of a single-carrier modulation, the time/frequency converter 25 and the OFDM modulators $27_1$ to $27_{Ntx}$ are replaced by at least two single-carrier modulators each associated with an antenna, in the context of an MIMO system. The architecture of a transmitter according to this example is more specifically described in the document "*Space-Time block coding: A simple transmitter diversity technique for wireless communications*" (S. Alamouti, IEEE Journal On Select Areas In Communications, vol. 16, pages 1451 to 1458, October 1998).

Figure 3:
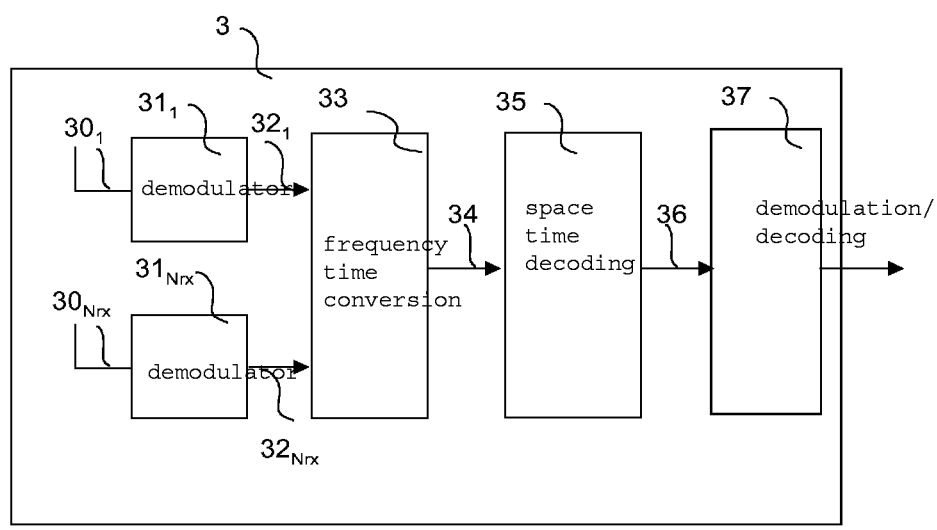
FIG. 3 shows the main steps implemented by a receiver for a first application of an embodiment of the invention.

In reference to FIG. 3, the steps implemented by a receiver 3 during receiving of a signal will now be described. Such a receiver 3 can in particular be integrated in stations 10 to 12.

According to the example shown, the receiver 3 receives a signal y transmitted by the transmitter 2 in a wireless channel. Such a channel is generally noisy. It is a channel with additive white Gaussian noise (AWGN) subjected to fading. The signal transmitted by the transmitter 2 can also be affected by echoes due to the multiple paths and/or the Doppler effect.

According to the example shown, the receiver 3 implements:

receiving, on Nrx receiving antennas $30_1$ to $30_{Nrx}$, in which each receiving antenna is associated with an OFDM demodulator $31_1$ to $31_{Nrx}$;

an OFDM demodulation $31_1$ to $31_{Nrx}$ of the signal received on each receiving antenna, delivering demodulated signals $32_1$ to $32_{Nrx}$;

a frequency/time conversion 33 implementing a reverse operation of the time/frequency conversion implemented in transmission, delivering a signal 34 in the frequency domain;

a space/time decoding 35, delivering a decoded signal 36;

a demodulation associated with a decoding 37.

According to the example shown, the receiver 3 implements a reverse processing of the processing implemented in transmission. Thus, if a single-carrier modulation is implemented in transmission instead of a multi-carrier modulation, the OFDM demodulators $31_1$ to $31_{Nrx}$ are replaced by corresponding single-carrier demodulators.

More specifically, the receiver 3 includes Nrx receiving antennas $30_1$ to $30_{Nrx}$. In this way, the signal received can be represented by a matrix of size Nrx×N, or equivalently by a vector R of size (Nrx×N)×1, where N is, for example, equal to 2 and represents the time and/or frequency range occupied by the space/time code.

The transmission between the coder 23 and the decoder 35 can then be modelled by the following equation:

$$R = \underbrace{\begin{pmatrix} H_1 & 0 & \cdots & 0 \\ 0 & H_2 & \ddots & \vdots \\ \vdots & \ddots & \ddots & 0 \\ 0 & \cdots & 0 & H_N \end{pmatrix}}_{G} CS + v = GS + v \quad (1)$$

with:

R the complex vector of size (Nrx×N)×1, received on the Nrx receiving antennas;

$H_i$ the complex channel matrix of size Nrx×Ntx at the time/frequency interval i, in which the frequency corresponds to a carrier of the multi-carrier modulation. If the modulation implemented is a single-carrier modulation, the interval i corresponds to a time interval;

H=diag($H_1, \ldots H_N$) the complex block diagonal channel matrix of size (N×Nrx)×(N×Ntx) at the time/frequency intervals 1 to N;

C the complex space/time coding of size (Ntx×N)×Q, in which Q is the number of complex symbols input per STBC code word;

S the complex input vector of the discrete modulated symbols, of size Q×1;

v the complex additive white Gaussian noise vector of size (N×Nrx)×1, with the self-correlation matrix $R_v = \sigma^2 \text{INNrx}$, in which INNrx is the unit matrix of size (N×Nrx)×(N×Nrx), and $\sigma^2$ represents the variance of the AWGN noise.

It should be noted that, if the space-time coding implements real input, instead of complex input, the time-space coding Matrix C is a real matrix having a dimension (2Ntx×N)×2Q.

In addition, when the additive noise and the interference affecting the signal received are not white, a whitening filter can be implemented in front of the space/time decoder 35. The variable $\sigma^2$ then represents the variance of the resulting whitened noise.

The stack decoding algorithm according to an embodiment of the invention can be implemented in the space/time decoding step 35. It is then considered that the space/time decoder is a stack decoder, which enables an ML decoding of the coded signal to be performed.

This decoder provides one or more candidate signals, in the form of paths stored in a second stack.

These paths can in particular be used to assign a likelihood probability to the bits of an estimated symbol.

The STBC decoder 35 then provides the path obtained, or the likelihood probabilities obtained at the demodulator/decoder 37.

The demodulator/decoder 37 is, for example, a soft Viterbi decoder, implementing reverse operations of the modulation 21 and convolutional coding 29 steps.

This demodulator/decoder 37 provides an estimation of said data signal, by taking into account the path(s) stored in said second stack. This estimation can be binary or probabilistic, according to the number of iterations implemented.

For example, if the transmission chain does not comprise a convolutional coding, a single iteration is enough to decode the message, and the first path found makes it possible to obtain a binary estimation of the signal sent.

Figure 4:
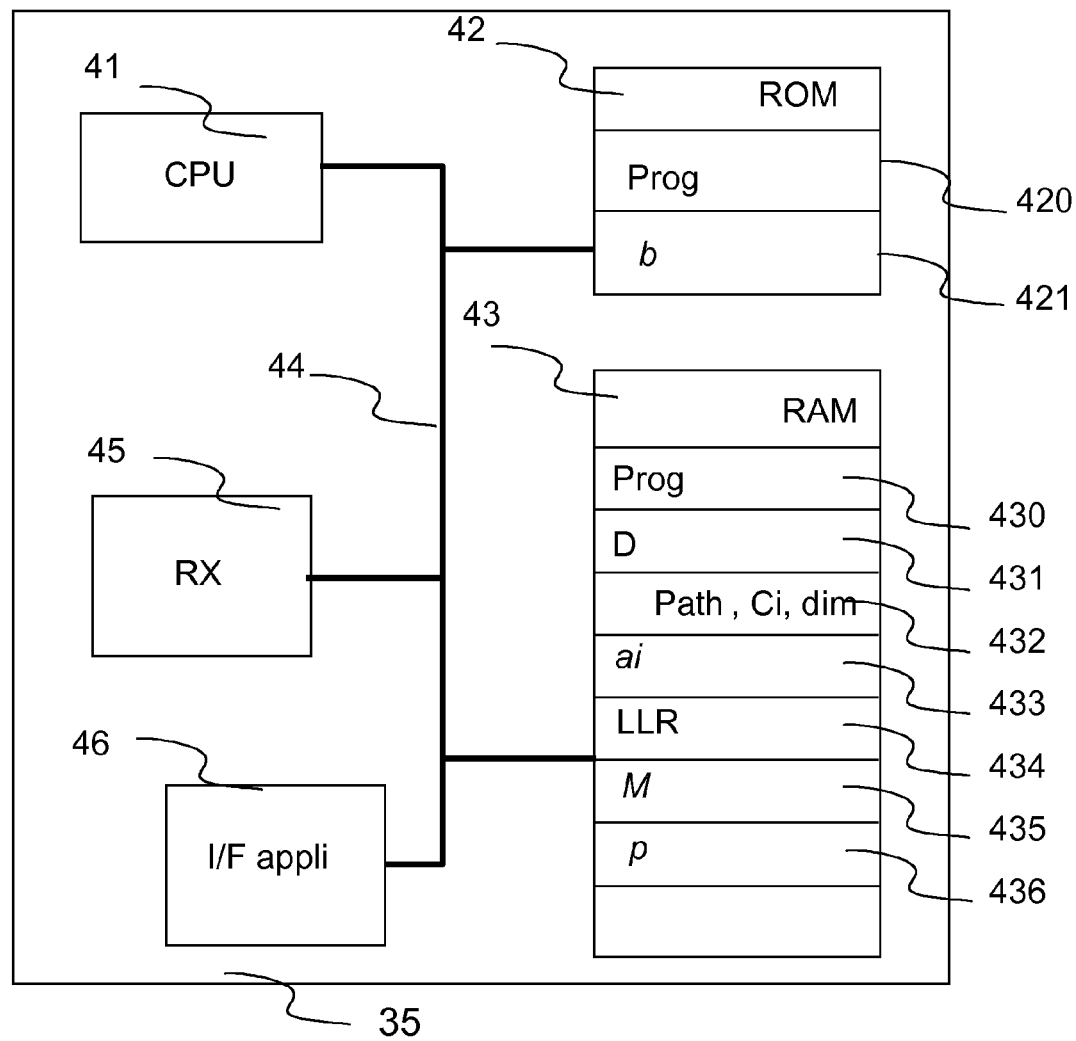
FIG. 4 shows an example of the architecture of a decoder implementing a specific embodiment of the invention.

FIG. 4 more specifically shows an example of the architecture of a space/time decoder 35 of the receiver 3. According to this example, the space/time decoder 35 includes the following elements, which are linked together by a data and address bus 44:
- a microprocessor 41 (or CPU), which is, for example, a digital signal processor (DSP);
- a non-volatile memory 42 (or ROM, read-only memory);
- a random access memory RAM 43;
- an interface 45 for receiving input signals coming from the time/frequency converter 33;
- an interface 46 for transmitting decoded data to the demodulator/decoder 37.

In each of the memories mentioned, the word "register" used in the description can correspond to a low-capacity area (several bits) or to a very large area (for example, an entire program or a large amount of data received or decoded).

The non-volatile ROM memory 42 includes:
- a program Prog 420;
- a bias b 421.

The algorithms for implementing the method according to this embodiment of the invention can be stored in the register 420. When it is turned on, the CPU processor 41 downloads the program 420 to the RAM memory and runs the corresponding instructions.

The RAM memory 43 includes:
- in a register Prog 430, the program run by the microprocessor 41 and downloaded after the space/time decoder 35 has been turned on;
- input data in a register 431;
- data relating to the nodes in a register 432, corresponding to a first stack;
- data relating to the paths determined in each iteration, designated by in a register 433 corresponding to a second stack;
- likelihood probabilities or LLR in a register 434;
- the maximum number of paths capable of being stored in the second stack, designated by M in a register 435; and
- a counter p used to count the number of paths stored in the second stack, defined in a register 436.

More specifically, the data stored in the register 432 includes, for a node of the decoding tree, the cost associated with this node, the path from the root to said node, and optionally the dimension of said node, i.e. its depth in the tree. It is noted that the cost associated with a current node is defined by the Euclidean distance between the signal received and the path between the root node and the current node.

According to another embodiment, the decoding technique can be implemented according to a hardware-only configuration (for example, in one or more FPGA, ASIC or VLSI integrated circuits with the corresponding memory) or according to a configuration using both VLSI and DSP.

Figure 5:
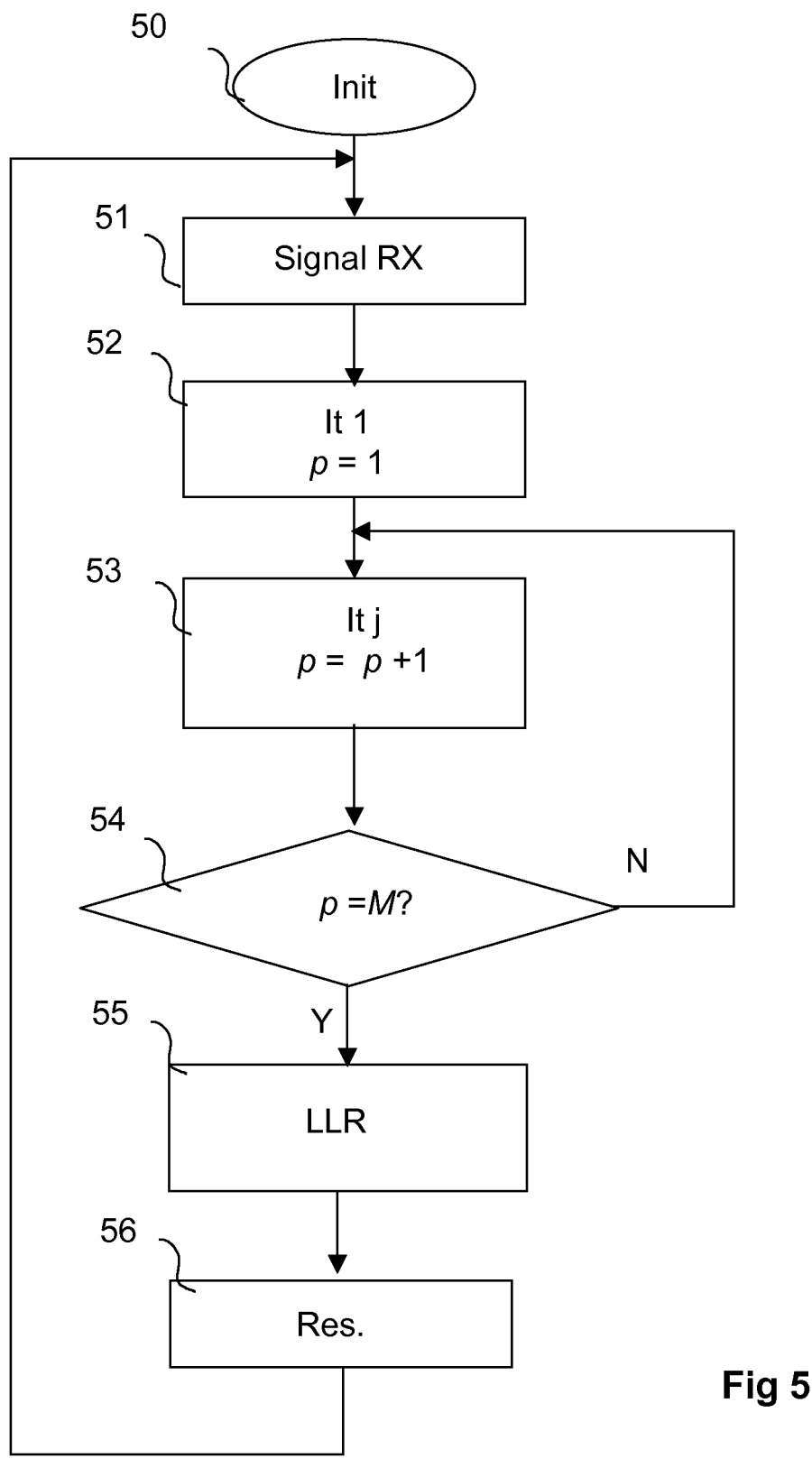
FIG. 5 shows the different steps implemented by the decoding method according to a specific embodiment of the invention.

FIG. 5 more specifically shows the various steps implemented by the decoding method according to a specific embodiment of the invention. It is considered according to this embodiment that a plurality of iterations are implemented, enabling each to determine a path between a root node and a leaf node of the tree, corresponding to a potential transmitted signal.

Thus, according to this example embodiment, the decoder delivers a soft decision, i.e. a probabilistic estimation of a transmitted symbol.

To do this, the space/time decoder 35 implements at least two stack decoding iterations:
- a first iteration enabling a first path between the root node of the tree and a leaf node to be stored, corresponding to a first candidate signal;
- at least one second iteration enabling at least one second path between the root node of the tree and another leaf node to be stored, corresponding to at least one second candidate signal.

More specifically, in an initialization step 50, the various parameters of the method are initialized. For example, the counter p is reset to zero.

During a next step 51, the decoder waits to receive a signal, sent for example from the time/frequency converter 33.

Once the signal has been received, the decoder implements a first stack decoding iteration 52. During this first iteration, the best path between the root node of the tree and a leaf is stored in the second stack. The iteration counter p is set to the value 1 (p=1). This first iteration can implement a classic stack decoding algorithm. Advantageously, it implements a reduction of the number of son nodes generated by selecting only the son nodes belonging to a predetermined interval.

If the maximum number of iterations M is equal to 1, a single iteration is performed, and a binary output of the algorithm is given.

Then, the decoder implements a second stack decoding iteration 53. During this second iteration, the best path between the root node of the tree and a new leaf is stored in the second stack. The iteration counter p is incremented by a unit (p=p+1). This new iteration 53 is therefore based on a reduced tree excluding the paths previously stored in the second stack. In other words, the second iteration applies a stack decoding technique to the tree used by the first stack decoding iteration, excluding the path obtained in the first iteration.

Then, in a test step 54, a test is performed to determine whether the iteration counter p has reached the maximum number of iterations M.

The maximum iteration number is equal to the number of leaf nodes in the decoding tree.

To limit the decoding time, it is possible to limit the number of iterations by limiting the size of the second stack: as each path obtained during an iteration is stored in the second stack, the number of iterations may be limited by the size of the second stack.

According to another alternative also making it possible to limit the decoding time, it is possible to set a maximum cost which cannot be exceeded by the leaf node(s), and to generate only the paths having a cost of less than or equal to said predetermined threshold. In other words, a first path is stored in the second stack during the first iteration, then a second path is stored during the next iteration, then a third path is stored in the next iteration, and so on, as long as the cost associated with the last path stored remains less than or equal to this predetermined threshold.

Thus, if the iteration counter p has not reached the maximum number of iterations M, the decoder implements a new stack decoding iteration 53, and increments the iteration counter by one unit. The $j^{th}$ stack decoding iteration is applied to the signal received while excluding the path(s) determined during the (j-1) previous iterations of the stack decoding.

If the iteration counter p has not reached the maximum number of iterations M, meaning that all of the paths have been determined and stored in the second stack, a likelihood probability is assigned to each bit of the estimated symbol, in a step 55.

For example, if the path obtained during a first iteration is the path defined by the bits [1011], and the path obtained during a second iteration is the path defined by bits [1111], it is possible to assign a high likelihood probability to the first, third and fourth bits. However, a lower likelihood probability will be assigned to the second bit, which is equal to 0 according to the path defined by the first iteration, and equal to 1 according to the path defined by the second iteration.

These a posteriori probabilities can in particular be expressed in the form of a logarithm of the likelihood ratio (LLR, log likelihood ratio). Thus, once all of the paths have been determined (i.e. all of the iterations are implemented), an LLR is calculated for each symbol of the modulation.

By denoting the signal received as y and the channel matrix H, the LLR of the $i^{th}$ bit $b_i$ can be expressed as follows, as described in the documents "*Soft-Input soft-output lattice sphere decoder for linear channels*" (J. Boutros et al., IEEE Global Telecommunications Conference, 2003) and "*Achieving near-capacity on a multiple-antenna channel*" (B. Hochwald et al., IEEE Transactions on communication, March 2003):

$$LLR(b_i) = \log\frac{P(b_i = 1 \mid y, H)}{P(b_i = 0 \mid y, H)}$$

These test 54 and likelihood probability determination 55 steps are, for example, performed by a DSP and/or by a VLSI (for example of the ASIC or FPGA type).

Finally, during a step 56, the likelihood probabilities assigned to the different bits are transmitted to the demodulator/decoder 37. In this way, it is possible to determine an estimation of the data signal, taking into account the different paths stored in the second stack.

After the step 56 of transmission of the result, the initialization step 51 can be reiterated.

Below, the steps implemented during iterations 52 and 53 are described in detail, in relation to FIG. 6.

To do this, it is again considered that the signal received can be expressed in the following form:

$$R = \underbrace{\begin{pmatrix} H_1 & 0 & \cdots & 0 \\ 0 & H_2 & \ddots & \vdots \\ \vdots & \ddots & \ddots & 0 \\ 0 & \cdots & 0 & H_N \end{pmatrix}}_{G} CS + v = GS + v \quad (1)$$

It is also assumed that the decoder knows the channel matrix $H=\text{diag}(H_1, \ldots, H_N)$. To do this, a classic channel estimation technique, based on the knowledge of pilot symbols, can be implemented.

Each space/time code word is therefore obtained by a matrix multiplication CS.

It can be noted that the coding of the incoming signal S can be represented by multiplications of complex matrices or by real matrices in which the real and imaginary parts are coded separately. For example, the coding scheme described in the document "*Space-Time block coding: A simple transmitter diversity technique for wireless communications*" cited above can be represented only with real notations.

Thus a more general expression of the equation (1) gives:

$$\underbrace{\begin{pmatrix} R^R \\ R^I \end{pmatrix}}_{R'} = \underbrace{\begin{pmatrix} H^R & -H^I \\ H^I & H^R \end{pmatrix} C'}_{G'} \underbrace{\begin{pmatrix} S^R \\ S^I \end{pmatrix}}_{S'} + \underbrace{\begin{pmatrix} v^R \\ v^I \end{pmatrix}}_{v'} \quad (2)$$

where:
C' is the space/time coding matrix with real notations,
$(.)^R$ and $(.)^I$ respectively designate the real and imaginary parts of a number or a complex matrix.

With real notations, the dimension of the incoming signal S' is K=2Q. When S is modulated by using a quadrature amplitude modulation, each of the components of S' is subjected to a pulse amplitude modulation (PAM). The matrix G' then corresponds to a base of a lattice of dimension K=2Q.

It should be noted that the sequential decoding algorithms advantageously use a triangular matrix as a base. Consequently, it is preferable to perform a decomposition of the fading matrix G', also called the equivalent channel matrix (taking into account the channel matrix and the space/time coding matrix).

In this way, it is preferable to construct the decoding tree from a decomposition QR of the matrix G'.

The following is thus obtained (where the operator designates the transpose):

$$R_p = Q'R' = US' + \eta$$

$$R_p = U'G'R' = US' + \eta$$

where:
G'=QU is the decomposition QR of the matrix G';
U is an upper triangular matrix of size K×K;
Q is an orthogonal matrix such that $Q \times Q' = I_k$;
$R_p$ is the new observation vector of size K×1; and
$\eta$ is the noise vector of size K×1 with the self-correlation $$R_\eta = \frac{\sigma^2}{2} I_K.$$

The triangular matrix U then corresponds to the new base used by the sequential decoding algorithm.

According to an alternative, the time/frequency dimension N is replaced by a time dimension if a single carrier modulation is used.

On the basis of the new signal observed $R_p$ and the knowledge of the channel, the decoder can construct a decoding tree and find a good estimation of the signal transmitted S.

It is also possible to use a Cholesky decomposition of the Gram matrix to decompose the matrix G' and obtain a triangular matrix as the base.

To do this, the CPU carries out a triangular decomposition. This operation provides a triangular matrix U corresponding to the Gram matrix. More specifically, owing to the structure of G', a triangular matrix U is defined as follows:

$$G''G' = U'U$$

Then, the signal received is projected into the triangular matrix U determined in the previous step. This projection first multiplies the signal received R' by $G'^t$ and then by the inverse of $U^t$.

Figure 6:
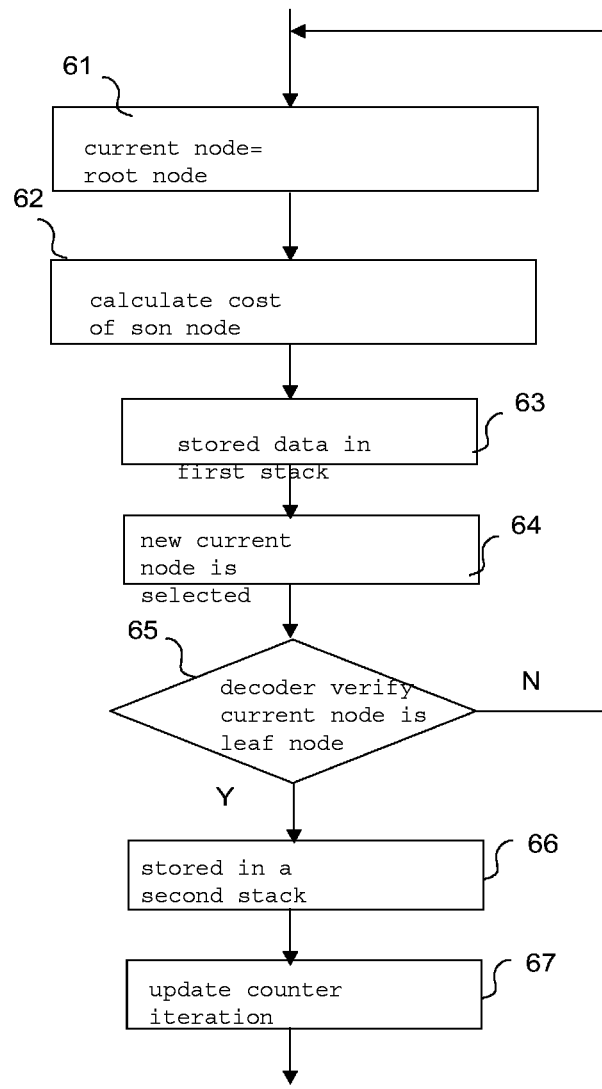
FIG. 6 shows the implementation of a stack decoding iteration of FIG. 5.

As shown in relation to FIG. 6, during the stack decoding iterations 52 and 53, first (61), the son nodes of a current node are determined.

During the first selection step 61, the current node corresponds to the root node.

Each node is associated with a cost (or metric), a path, and optionally a dimension (or depth). The dimension corresponds to the number of levels between a node in question and the root, depth of the tree. The metric of a node corresponds to the Euclidean distance (or, according to an alternative, to a function of the distance such as, for example, the square of the distance) between the signals received and the path between the root node and the node considered. In the tree, there is a single path between the root node and the node considered. This path makes it possible to determine the corresponding decoded bits (or an estimation of the information sequence transmitted) between the root node and the node considered.

During a next step 62, the costs of the son nodes belonging to a predetermined interval are calculated. The cost associated with a son node is equal to the sum of the cost of its parent node and the contribution of the path between its parent node and itself (Euclidean distance between the signal received and the path relating to a transition between the parent node and the son node considered). This embodiment allows for ML decoding.

According to an alternative of the invention, a bias (or a multiple of a fixed bias designated by b) is subtracted from the cost associated with the son node. The cost associated with a son node with a dimension dim comprises a total bias equal to the dimension dim multiplied by b. This alternative enables the complexity to be reduced, but has a performance inferior to that of the ML decoding. The decoding complexity is therefore reduced, but the decoding is suboptimal. The bias is chosen according to a desired binary error rate (BER), so as to obtain a good signal-to-noise ratio (SNR) while preserving reasonable complexity. More specifically, when a bias is introduced, the most advanced paths in the tree are preferred and a leaf node is reached more quickly. In this way, the higher the bias is, the faster the decoder can provide a solution.

Once the costs associated with the son nodes have been calculated, the data relating to the son nodes (cost, path, optionally dimension) is stored in a first stack. Then, the common node is deleted from the first stack in a step 63.

In a step 64, a new current node is selected from the first stack taking into account the associated cost. According to the embodiment described, the node with the lowest cost is chosen.

If the first stack is ordered according to costs, so that the node having the lowest cost is located at the top of the stack, the node selected in step 64 is the first node of the stack.

In a test step 65, the decoder verifies that the new current node is a leaf node. If this is not the case, step 61 of selecting at least one son node is repeated for the new current node.

If the new current node is a leaf node, the path between the root node of the tree and the leaf node is stored in a second stack, in a step 66. In other words, the candidate signal is selected and stored in the memory. This leaf node is then deleted from the first stack.

The iteration counter p is then updated in a step 67. It is noted that p is equal 1 to for the first iteration (52), then incremented by a unit during subsequent iterations (53).

The son nodes considered belong to a predetermined interval, which means that a son node is taken into consideration only when its metric is less than or equal to a threshold designated by C. In this way, only the data relating to the son nodes having a cost below the threshold C is stored in the first stack.

This threshold corresponds, for example, to the radius of a sphere centred on the signal received, and the paths scanned in the tree corresponding to the points of the lattice located inside this sphere.

For example, by using the same formulas as those proposed in the document "*A Universal Lattice Code Decoder for Fading and Channels*", for each real or imaginary component of a symbol of the signal to be decoded, an interval $I_i=[binf_i, Bsup_i]$ is obtained. To add the constraint associated with the constellation, the intersection between the interval [Cmin, Cmax] corresponding to the constellation (with a change in variable to be in Z) and the intervals $I_i$ is produced. The final interval to which the nodes of the $i^{th}$ level can belong is:

$$I_{ifinal}=[\max(C\min,Binf_i), \min(C\max,Bsup_i)].$$

This value of threshold C can be set arbitrarily.

For example, the radius can be calculated as a function of the signal-to-noise ratio SNR by using the following formula, proposed by Hassibi et al. in "*On the expected complexity of sphere decoding*":

$$C=\sqrt{2n\sigma^2},$$ where n is the dimension of the network.

A better choice of the radius can be made by taking into account the fading of the channel, and consequently the matrix G', as is proposed for sphere decoders. Thus, the radius can be calculated by using the following formula, proposed by G. Rekaya in "*Nouvelles constructions algébriques de code spatio-temporels atteignant le compromis multiplexage-diversité*":

$$C=\sqrt{\min(2n\sigma^2,\min(\text{diag}(G'^T G')))}$$

The value of the threshold C can also be defined dynamically, according to one or more characteristics of the transmission channel.

In this way, only the son nodes of a current node having a cost less than or equal to the threshold C, determined dynamically or set arbitrarily, are stored in the first stack in step 63. It is considered, for example, that, for a current node, the k son nodes having the lowest metrics are preserved and the others are rejected.

For example, if the maximum number of sons for a node is equal to 2, C can be chosen so as to have k equal to 1. Thus, the number of possible paths in the tree is consequently reduced.

The value of k can in particular be dependent on the depth inside the tree. Thus, more son nodes can be generated for small dimensions and fewer son nodes can be generated for larger dimensions. For example, when seeking to decode four complex modulation symbols 4-QAM, a tree with a depth equal to 8, in which each node has two sons, can be used. For the first four dimensions, it is possible each time to determine the two possible son nodes, then for the last four dimensions, it is possible to generate only one of the two son nodes.

Figure 7:
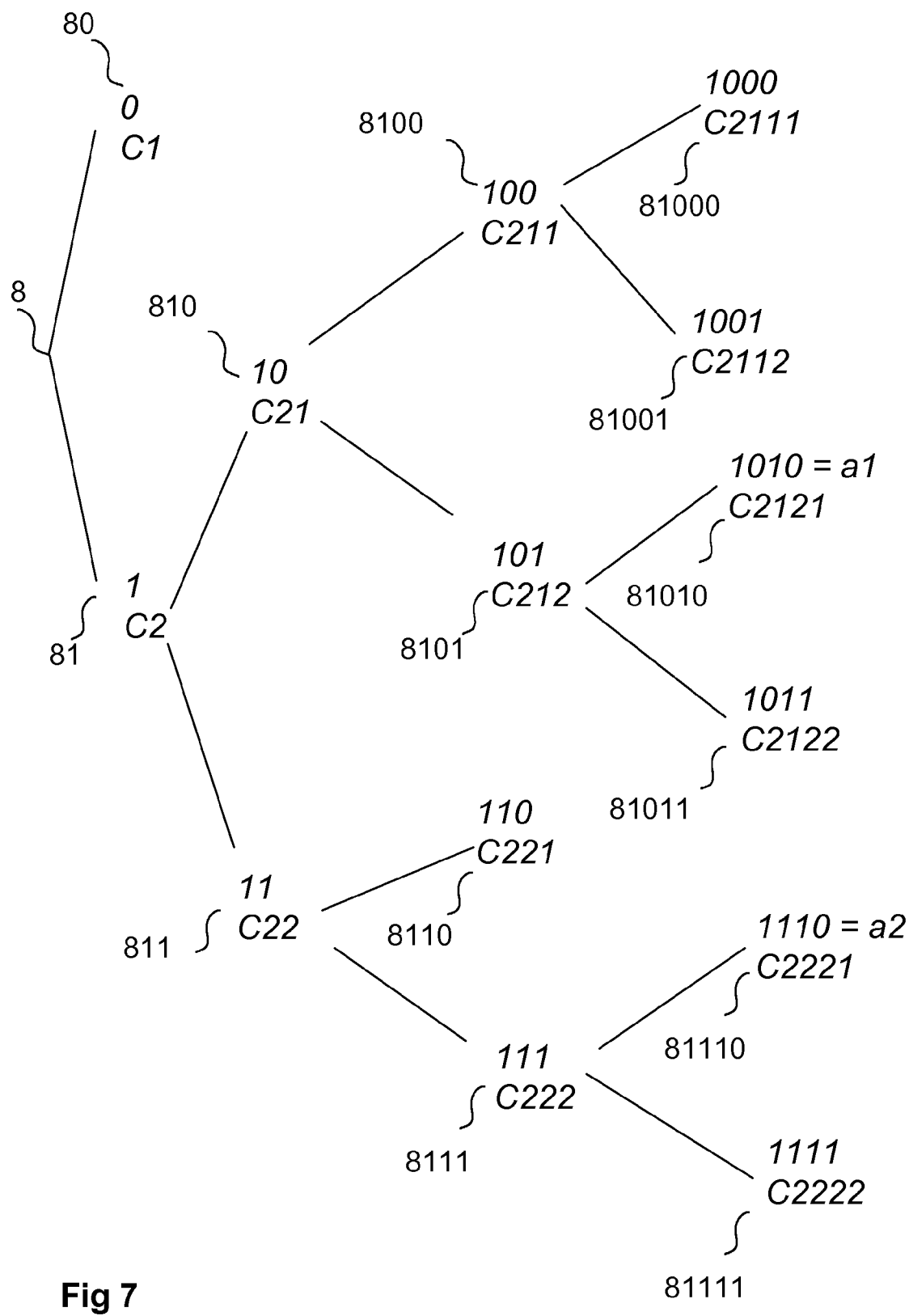
FIG. 7 shows an example of a decoding tree associated with the decoding method according to FIG. 5.

In reference to FIG. 7, the decoding tree constructed after two stack decoding iterations 52 and 53 corresponding to the embodiment shown in FIG. 6 will now be described.

It is considered that the threshold C is very large, so as to cover as many paths as possible.

First, from root node 8, two son nodes 80 and 81 are generated during the steps of generating at least one son node 61 and of calculating the associated costs 62. The corresponding path and metric are respectively:

0 and C1 for son node 80; and 1 and C2 for son node 81.

The first stack then contains the data associated with nodes 80 and 81.

Then, assuming that metric C2 is less than metric C1 (C2<C1), the new current node selected during step 64 is node 81.

From the new current node 81, two son nodes 810 and 811 are generated during the steps of generating at least one son node 61 and of calculating the associated costs 62. The corresponding path and metric are respectively:

10 and C21 for node 810; and 11 and C22 for node 811.

Assuming that metric C21 is less than metric C22, the new current node selected during step 64 is node 810. In addition, if the first stack is ordered by positioning, at the top of the stack, the node having the lowest cost, and assuming that metric C22 is less than metric C1. (C21<C22<C1), then the first stack contains node 810 (top of the stack), then node 811 and finally node 80 (base of the stack). The contents of the first stack at this time are shown in FIG. 8A.

From the new current node 810, two son nodes 8100 and 8101 are generated. The corresponding path and metric are respectively:

100 and C211 for node 8100; and 101 and C212 for node 8101.

Assuming that metric C211 is less than metric C212, the new current node selected during step 64 is node 8100. If metric C212 is less than metric C22 (C211<C212<C22<C1), then the first stack contains node 8100 (top of the stack), then node 8101, then node 811 and finally node 80 (base of the stack). The contents of the first stack at this time are shown in FIG. 8B.

From the new current node 8100, two son nodes 81000 and 81001 are generated. The corresponding path and metric are respectively:

1000 and C2111 for node 81000; and 1001 and C2112 for node 81001.

Assuming that metric C212 is less than metric C2111 and C2112, the new current node selected during step 64 is node 8101.

If metric C22 is less than metric C2112, which is less than metric C2111, itself less than C1 (C212<C22<C2112<C2111<C1), then the first stack contains node 8101 (top of the stack), then node 811, then node 81001, then node 81000 and finally node 80 (base of the stack). The contents of the first stack at this time are shown in FIG. 8C.

From this new current node 8101, two son nodes 81010 and 81011 are generated. The corresponding path and metric are respectively:

1010 and C2121 for node 81001; and 1011 and C2122 for node 81011.

Assuming that C2121<C22<C2122<C2112<C2111<C1, the new current node selected during step 64 is node 81010.

The first stack then contains node 81010 (top of the stack), then node 811, then node 81011, then node 81001, then node 81000 and finally node 80 (base of the stack). The contents of the first stack at this time are shown in FIG. 8D.

If the new node selected 81010 is identified as being a leaf node during the test step 65, then the path between the root of the tree and node 81010 is stored in a second stack. It is a first candidate signal, denoted a1. Thus, the second stack contains path C2121, corresponding to the bits [1010].

The first stack decoding iteration 52 is terminated.

If the maximum number of iterations M is equal to 1, a single iteration is performed, and a binary estimation of the transmitted sequence is calculated.

If the maximum number of iterations M is greater than 1, a second iteration is performed.

The second stack decoding iteration 53 is implemented. This second iteration is applied to the tree while excluding the first candidate solutional, i.e. by deleting the leaf node 81010 so as to determine a new path between the root of the tree and a leaf.

To do this, after deleting the current node 81010 from the first stack, a new current node is selected, having a lower associated cost. This is node 811.

From the new current node 811, two son nodes 8110 and 8111 are generated. The corresponding path and metric are respectively:

110 and C221 for node 8110; and 111 and C222 for node 8111.

Assuming that metric C222 is less than metric C221 (C222<C2122<C2112<C2111<C221<C1), the new current node selected in step 64 is node 8111. The first stack then contains node 8111 (top of the stack), then node 81011, then node 81001, then node 81000, then node 8110, and finally node 80 (base of the stack). The contents of the first stack at this time are shown in FIG. 8E.

From the new current node 8111, two son nodes 81110 and 81111 are generated. The corresponding path and metric are respectively:

1110 and C2221 for node 81110; and 1111 and C2222 for node 81111.

Assuming that metric C2221 is less than metric C2222 (C2221<C2222<C2122<C2112<C2111<C221<C1), the new current node selected in step 64 is node 81110.

The first stack then contains node 81110 (top of the stack), then node 81111, then node 81011, then node 81001, then node 81000, then node 8110 and finally node 80 (base of the stack). The contents of the first stack at this time are shown in FIG. 8F.

If the new selected node 81110 is identified as being a leaf node during the test step 65, then the path between the root of the tree and node 81110 is stored in the second stack. It is a second candidate signal, denoted a2. Thus, the second stack contains, in addition to path C2121, corresponding to bits [1010], determined during the first iteration, path C2221, corresponding to bits [1110].

The second stack decoding iteration 53 is terminated.

It is possible to perform new iterations, by deleting the current node 81110 of the first stack.

As already discussed, FIGS. 8A to 8F show the contents of the first stack at different stages of the decoding step. Advantageously, during the storage step, node data is stored in the first stack according to a decreasing order of metrics associated with the nodes. Thus, the data of a node corresponding to the lowest cost are at the top of the stack, and the data of a node corresponding to the highest cost are at the base of the stack. The sorting of data during the storage step can be implemented by comparing the data of the nodes newly stored with the costs of the nodes already stored. It is not necessary to compare the costs of the nodes already stored in the first stack. This method corresponds to sorting by insertion. In this way, during the step of selecting a new current node, it is enough to select the node located at the top of the stack.

The second stack, which includes a list of candidate paths, is ordered by construction. During the step of determining a probabilistic estimation of the data signal, it is possible to choose to assign a higher confidence to the paths located at the top of the second stack. Thus, it is possible to use only the most reliable paths of the second stack in order to calculate the likelihood probabilities.

3. Application to Multi-User Systems

Below, an example embodiment of the invention will be described in the context of a multi-user detection.

In this context, a transmission system including a receiver and a plurality of transmitters, each including a single antenna, and each transmitter capable of being identified by a multiple access scheme (for example, of the CDMA type (Code Division Multiple Access) or flash OFDM type, etc.) is considered. Multiple users therefore share the same transmission resource in order to transmit data to the receiver.

In the application to the detection of multi-users, as in the multi-antenna application described above, the problem of decoding includes an estimation of a discrete transmitted input vector, based on an observation of the signal received, corresponding to the transmitted vector disrupted by the channel.

For a multi-user detection according to this application example, the input vector consists of real and imaginary components of the set of symbols transmitted by Q users in a given time and/or frequency region, dependent on the multiple access scheme. For example, in the context of CDMA-type multiple access, the region corresponds to the time duration of the spreading sequences. The value Q corresponds in this case to the number of transmitters used, in the same way that Q indicates the number of symbols per space-time code word in the example of the application in multi-antenna systems discussed above.

The observation of the signal is comprised by the set of responses associated with the signals transmitted by each transmitter. The linear distortion of the signals transmitted can be represented by a matrix comprised by the set of equivalent channel matrices between the Q transmitters and the receiver, taking into account the multiple access scheme. For example, in CDMA, this linear distortion corresponds to a combination between the different channel matrices and the correlation matrix of the spreading code subset. The additive noise is the thermal additive white Gaussian noise at the receiver and its amplitude obeys a law in $\chi^2$.

Figure 9:
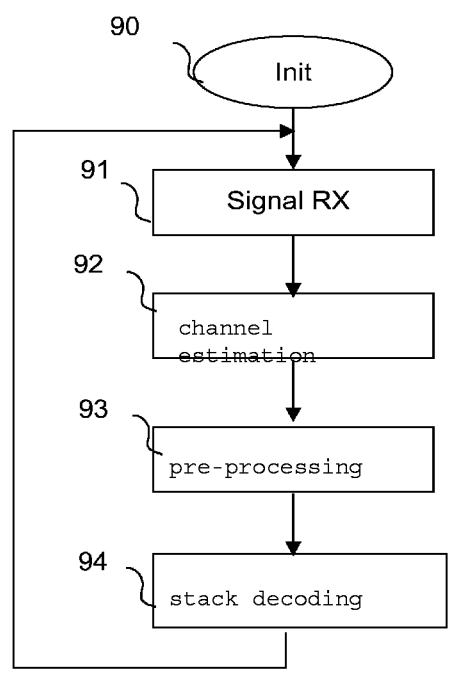
FIG. 9 shows the main steps implemented by a receiver for a second application of an embodiment of the invention.

FIG. 9 shows a multi-user detection according to a specific embodiment of the invention. This detection is implemented in a receiver that receives data from Q transmitters using, for example, code division multiple access (CDMA).

The decoding begins with an initialization step 90 during which different parameters of the method are set to their initial value(s).

Then, during step 91, the receiver waits to receive a signal from the filters matching the CDMA sequences used.

An estimation of the different transmission channels between the Q transmitters and the receiver is then implemented during a step 92. For example, this estimation is based on the pilot sequences used specifically by each transmitter.

The receiver can thus deduce therefrom the value of σ by using, for example, pilot sequences. This step can be performed after each channel estimation, or each time a signal corresponding to a single transmitted block is received.

Then, the receiver performs a pre-processing step 93, during which the matrix comprised by the set of equivalent channel matrices between the Q transmitters and the receiver, taking into account the multiple access scheme, is replaced by the equivalent channel matrix G'.

Finally, the receiver performs a stack decoding during a step 94, implementing at least one stack decoding iteration.

For example, the receiver implements steps 52 to 56 described above in reference to FIG. 5, so as to obtain a probabilistic estimation, in which the candidate signal of FIG. 5 is replaced by a set of signals transmitted by the Q transmitters.

Then, step 91 is repeated.

It can be noted that, according to this application for multi-user detection, certain transmitters and/or the receiver may use a plurality of antennas. The signal transmitted between the different transmitters and the receiver can also be single-carrier or multi-carrier.

4. Alternative Embodiments

Of course, the invention is not limited to the example embodiments described above.

In particular, one or more embodiments of the invention can be used regardless of the type of transmission (point-to-point, multipoint-to-point, local wireless network, mobile networks, digital broadcasting, satellite communication, etc.). The receiver shown in FIG. 3 then includes elements suitable for such an application (such as an MAC layer interface, a demodulator, or any other classic element used in digital communications).

An embodiment of, the invention is also very suitable for receiving television signals, transmitted for example according to the DVB (Digital Video Broadcasting), DVB-T (terrestrial), DVB-S (satellite) or DVB-H (mobile) standard, etc.

In addition, an embodiment of the invention can be used for decoding signals transmitted over a high-spectral efficiency wireless connection (such as a MEMO system and/or nQAM modulation) and, in particular, in a high-speed transmission.

Finally, the invention is not limited to multi-antenna or multi-user applications, and can, for example, be used in an application combining the MIMO decoding and multi-user detection techniques.

More generally, at least one embodiment of the invention has applications in any transmission system in which a probabilistic estimation of the signal is desired.

Although the present disclosure has been described with reference to one or more examples, workers skilled in the art will recognize that changes may be made in form and detail without departing from the scope of the disclosure and/or the appended claims.

The invention claimed is:

1. A method for decoding a received data signal, corresponding to a transmitted data signal transported by a transmission channel, wherein said method comprises
applying the received data signal to a decoder device:
progressively constructing a decoding tree with the decoder device, in which a node corresponds to a component of a symbol of said data signal, and is associated with a cost,
wherein said constructing implements at least two iterations of the following steps, for a current node of the tree stored in a first stack, in which each iteration makes it possible to store, in a second stack, a path between a root node of the tree and a leaf node:
selection of at least one son node of said current node belonging to a predetermined selection interval, if at least one such node exists;
storage, in said first stack, of the selected son nodes and the associated costs;
deletion, from said first stack, of said current node;
selection from said first stack of a new current node, taking into account the associated cost; and
if said new current node is a leaf node that does not have any son node, storage of the path between the first node of said tree, called the root node, and said leaf node, in the second stack, and deletion of the leaf node from the first stack;

otherwise, return to the step of selection of at least one son node for said new current node;

wherein said method comprises assigning a likelihood probability to bits of at least one symbol of the data signal, taking into account paths stored in the second stack, and wherein said method comprises determining a probabilistic estimation of said data signal, taking into account the path(s) stored in the second stack and likelihood probabilities.

2. The decoding method according to claim 1, wherein said selection interval is determined for each component of a symbol of said data signal from a first interval determined from a sphere of radius C centred on said data signal, and a second interval determined from a constellation of said symbols.

3. The decoding method according to claim 2, wherein the radius of said sphere is chosen according to at least one characteristic of said transmission channel.

4. The decoding method according to claim 1, wherein said iterations include a step of ordering said first stack, prior to the step of selection of a new current node, ordering said nodes according to the associated cost, the node having the lowest cost being located first in said first stack, wherein the cost associated with a node is defined by the Euclidean distance between the received signal and the path between said root node and said node, and wherein, during said step of selection of a new current node, the first node in said first stack is selected.

5. The decoding method according to claim 1, wherein said iterations are implemented as long as said second stack is not filled.

6. The decoding method according to claim 1, wherein said iterations are implemented as long as the cost associated with said current node is less than or equal to a predetermined threshold.

7. The decoding method according to claim 1, wherein said received signal comprises a multiple carrier signal.

8. The decoding method according to claim 1, wherein said data signal is transmitted on at least one transmission antenna and received on at least one receiving antenna.

9. The decoding method according to claim 1, wherein said iteration includes a step of determining the costs of the son nodes belonging to said selection interval, and of subtracting a bias from the cost associated with the son node, prior to said storage step.

10. A computer program product recorded on a non-transient computer-readable medium and capable of being run by a processor, wherein said computer program product includes program code instructions for implementation of a method for decoding a received data signal, corresponding to a transmitted data signal transported by a transmission channel, wherein said method comprises the following acts performed by the processor:

progressively constructing a decoding tree, in which a node corresponds to a component of a symbol of said data signal, and is associated with a cost, wherein said constructing implements at least two iterations of the following steps, for a current node of the tree stored in a first stack, in which each iteration makes it possible to store, in a second stack, a path between a root node of the tree and a leaf node:

selection of at least one son node of said current node belonging to a predetermined selection interval, if at least one such node exists;

storage, in said first stack, of the selected son nodes and the associated costs;

deletion, from said first stack, of said current node;

selection from said first stack of a new current node, taking into account the associated cost; and if said new current node is a leaf node that does not have any son node, storage of the path between the first node of said tree, called a root node, and said leaf node, in the second stack, and deletion of the leaf node from the first stack;

otherwise, return to the step of selection of at least one son node for said new current node;

wherein said method comprises assigning a likelihood probability to bits of at least one symbol of the data signal, taking into account paths stored in the second stack, and wherein said method comprises determining a probabilistic estimation of said data signal, taking into account the path(s) stored in the second stack and likelihood probabilities.

11. A device for decoding a received data signal, corresponding to a transmitted data signal transported by a transmission channel, wherein the device comprises:

means for progressive construction of a decoding tree, in which a node corresponds to a component of a symbol of said data signal, and is associated with a cost, and a first stack in which a current node of said tree is stored, wherein said means for progressive construction includes the following means, activated for at least two iterations enabling each to store, in a second stack, a path between a root node of the tree and a leaf node:

means for selecting at least one son node from said current node belonging to a predetermined selection interval, if at least one such node exists;

means for storing, in said first stack, the selected son nodes and the associated costs;

means for deleting, from said first stack, said current node;

means for selecting, from said first stack, a new current node, taking into account the associated cost; and means for storing the path between the first node of said tree, called the root node, and said leaf node, in the second stack;

means for deleting the leaf node from the first stack;

wherein the device also comprises:

means for assigning a likelihood probability to bits of at least one symbol of said data signal, taking into account the paths stored in the second stack, and means for determining a probabilistic estimation of the data signal, from the path(s) stored in the second stack and likelihood probabilities.

12. The device according to claim 11, wherein said decoding device comprises at least one circuit belonging to the group including:

FPGA (Field Programmable Gate Array);

ASIC (ApplicationSpecific Integrated Circuit);

VLSI (Very Large Scale Integration).

13. A method for decoding a received data signal, corresponding to a transmitted data signal transported by a transmission channel, wherein said method comprises the following acts implemented by a decoder device:

progressively constructing a decoding tree, in which a node corresponds to a component of a symbol of said data signal, and is associated with a cost, wherein said constructing implements at least two iterations of the following steps, for a current node of the tree stored in a first stack, in which each iteration makes it possible to store, in a second stack, a path between a root node of the tree and a leaf node:

selection of at least one son node of said current node belonging to a predetermined selection interval, if at least one such node exists, wherein said selection interval is determined for each component of a symbol of said data signal from a first interval determined from a sphere of radius C centred on said data signal, and a second interval determined from a constellation of said symbols;

storage, in said first stack, of the selected son nodes and the associated costs;

deletion, from said first stack, of said current node;

selection from said first stack of a new current node, taking into account the associated cost; and if said new current node is a leaf node that does not have any son node, storage of the path between the first node of said tree, called the root node, and said leaf node, in the second stack, and deletion of the leaf node from the first stack;

otherwise, return to the step of selection of at least one son node for said new current node;

wherein said method comprises assigning a likelihood probability to bits of at least one symbol of the data signal, taking into account paths stored in the second stack, and wherein said method comprises determining a probabilistic estimation of said data signal, taking into account the path(s) stored in the second stack and likelihood probabilities.

* * * * *

UNITED STATES PATENT AND TRADEMARK OFFICE
CERTIFICATE OF CORRECTION

PATENT NO. : 8,421,654 B2  Page 1 of 1
APPLICATION NO. : 12/991234
DATED : April 16, 2013
INVENTOR(S) : Othman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 203 days.

Signed and Sealed this
Eighth Day of September, 2015

Michelle K. Lee
*Director of the United States Patent and Trademark Office*